United States Patent
Zou et al.

(10) Patent No.: US 11,401,288 B2
(45) Date of Patent: Aug. 2, 2022

(54) BETA-AMINO PHOSPHONIC ACID DERIVATIVE AND PREPARATION METHOD THEREFOR

(71) Applicant: SOOCHOW UNIVERSITY, Suzhou (CN)

(72) Inventors: Jianping Zou, Suzhou (CN); Dongliang Zhang, Suzhou (CN); Chengkun Li, Suzhou (CN); Guoyu Zhang, Suzhou (CN); Zekun Tao, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 30 days.

(21) Appl. No.: 17/146,729

(22) Filed: Jan. 12, 2021

(65) Prior Publication Data
US 2021/0130376 A1   May 6, 2021

Related U.S. Application Data

(63) Continuation of application No. PCT/CN2018/095519, filed on Jul. 12, 2018.

(51) Int. Cl.
*C07F 9/38* (2006.01)
*B01J 25/02* (2006.01)

(52) U.S. Cl.
CPC ............. *C07F 9/38* (2013.01); *B01J 25/02* (2013.01)

(58) Field of Classification Search
CPC . B01J 25/02; C07F 9/38; C07F 9/3826; C07F 9/3882; A23K 50/40; G06N 3/08; G06Q 30/0281; G06Q 30/0631; G06Q 50/01; G06Q 50/22; G06Q 50/30
See application file for complete search history.

(56) References Cited

FOREIGN PATENT DOCUMENTS

| CN | 101343289 A | 1/2009 | |
|---|---|---|---|
| CN | 104370960 A | 2/2015 | |
| CN | 106892942 A | 6/2017 | |
| CN | 107325018 A | 11/2017 | |
| CN | 108727428 A | 11/2018 | |
| WO | WO-2020010586 A1 * | 1/2020 | ............. B01J 25/02 |

OTHER PUBLICATIONS

WO2020/010586 description translation (Year: 2020).*
Liu et al., ("Manganese(III) Acetylacetonate-Mediated Phosphorylation of Enamides at Room Temperature" Advance Synthesis & Catalysis, pp. 1-5 Published Jun. 21, 2018) (Year: 2018).*
WO2020010586 Claims translated (Year: 2020).*
Liu et al., "Manganese(III) Acetylacetonate-Mediated Phosphorylation of Enamides at Room Temperature" Advance Synthesis & Catalysis, pp. 1-5 (Jun. 21, 2018).

* cited by examiner

*Primary Examiner* — Yevgeny Valenrod
*Assistant Examiner* — Blaine G Doletski
(74) *Attorney, Agent, or Firm* — SZDC Law P.C.

(57) ABSTRACT

A method for preparing a β-amino phosphonic acid derivative includes: dissolving N-(arylvinyl)benzamide, dialkyl phosphite, manganese acetate, and potassium carbonate in a solvent and reacting at room temperature to obtain (2-benzamido-1-arylvinyl)dialkyl-phosphonate derivative; and hydrolyzing (2-benzamido-1-arylethyl)dialkylphosphonate derivative to obtain β-amino phosphonic acid derivative. The N-(arylvinyl)benzamide derivative is used as starting material. The raw materials are easy to obtain and are of many different types. A method of preparing β-aminophosphonic acid derivative includes: dissolving N-(arylvinyl) benzamide, dialkyl phosphite, manganese acetate and potassium carbonate in a solvent, reacting at room temperature to obtain (2-benzamide-1-arylvinyl) dialkyl phosphonate derivative, and then reducing and hydrolyzing the compound to obtain β-aminophosphonic acid derivative. The method of the invention has the advantages of short synthesis route, mild reaction conditions, simple reaction operation and post-treatment process, good yield, and is suitable for large-scale production.

11 Claims, No Drawings

BETA-AMINO PHOSPHONIC ACID DERIVATIVE AND PREPARATION METHOD THEREFOR

This application is the Continuation Application of PCT/CN2018/095519, filed on Jul. 12, 2018, which is incorporated by reference for all purposes as if fully set forth herein.

TECHNICAL FIELD

The invention relates to the technical field of organic compounds, and particularly relates to a β-amino phosphonic acid derivative and a preparation method therefore.

BACKGROUND TECHNIQUE

β-Aminophosphonic acid derivatives have a wide range of physiological activities, such as antibacterial, nerve stimulation, affecting cell growth and metabolism, analgesia, regulating blood pressure, regulating plant growth, etc., so they can be used as medicine, pesticides, antagonists, anthocyanins Synthetic inhibitors, fructose diphosphatase inhibitors, etc. (see Maier, L. Phosphorus Sulfur 1983, 14, 295; Abbenante, Giovanni; *Australian J. Chem.*, 1997, 50, 523-527).

In the prior art, the synthesis methods of β-amino phosphonic acid derivatives are mainly as follows:

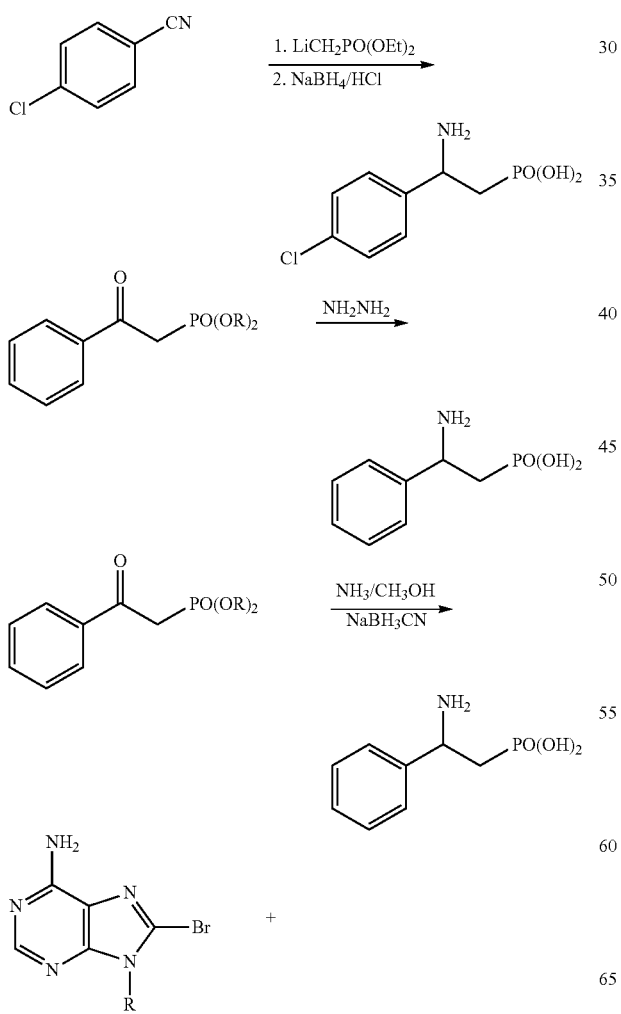

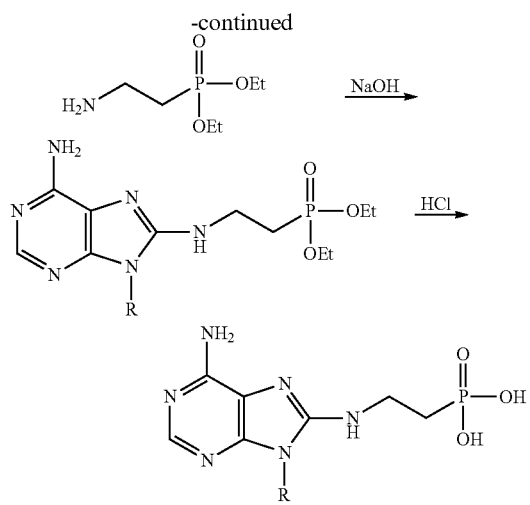

However, the prior art has the following problems: equivalent metal lithium reagent and sodium borohydride reducing agent are required, the reaction conditions are harsh, and the reaction steps are many; the raw materials are difficult to obtain, the reaction steps are many, and the yield is low; the expensive cyanoborohydride is needed, sodium has lower yield.

In summary, it is important to develop a method for preparing β-aminophosphonic acid derivatives with mild reaction conditions, wide application range, few reaction steps, high yield, low cost, and meeting the requirements of green chemistry.

Technical Problems

The object of the present invention is to provide a β-aminophosphonic acid derivative and a preparation method thereof.

Technical Solutions

In order to achieve the above-mentioned object of the invention, the technical solution adopted by the present invention is:

A method for preparing the β-amino phosphonic acid derivative includes the following steps: dissolving an N-(arylvinyl)benzamide derivative, a dialkyl phosphite, manganese acetate, and potassium carbonate in a solvent and reacting at room temperature to obtain a (2-benzamido-1-arylvinyl)dialkylphosphonate derivative; reducing the (2-benzamido-1-arylvinyl) dialkylphosphonate derivative to obtain a (2-benzamido-1-arylethyl) dialkylphosphonate derivative; hydrolyzing the (2-benzamido-1-arylethyl) dialkylphosphonate derivative to obtain β-amino phosphonic acid derivative.

The structural formula of N-(arylvinyl) benzamide derivative is shown as follow:

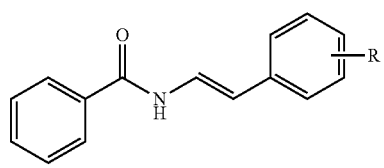

R is hydrogen, methyl, methoxy, fluorine, chlorine, or bromine.

The structural formula of dialkyl phosphite is shown as follow:

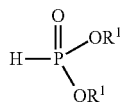

$R^1$ is methyl, ethyl, propyl, isopropyl, butyl, or tert-butyl.

A method for preparing a (2-benzamido-1-arylethyl) dialkylphosphonate derivative includes the following steps: dissolving an N-(arylvinyl)benzamide derivative, a dialkyl phosphite, manganese acetate, and potassium carbonate in a solvent and reacting at room temperature to obtain a (2-benzamido-1-arylvinyl) dialkylphosphonate derivative; reducing the (2-benzamido-1-arylvinyl) dialkylphosphonate derivative to obtain the (2-benzamido-1-arylethyl)dialkylphosphonate derivative.

The structural formula of N-(arylvinyl)benzamide derivative is shown as follow:

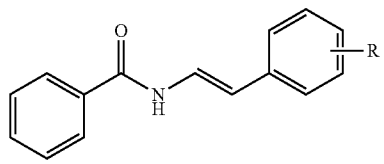

R is hydrogen, methyl, methoxy, fluorine, chlorine, or bromine.

The structural formula of dialkyl phosphite is shown as follow:

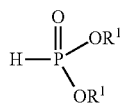

$R^1$ is methyl, ethyl, propyl, isopropyl, butyl, or tert-butyl.

The invention also discloses that application of N-(arylvinyl)benzamide and dialkyl phosphite as substrates in the preparation of β-aminophosphonic acid derivative or (2-benzamido-1-arylethyl) dialkylphosphine. Preferably, the preparation is performed in the presence of manganese acetate and potassium carbonate in the solvent, and at room temperature.

In the present invention, the dialkyl phosphite is selected from the group consisting of dimethyl phosphite, diethyl phosphite, and diisopropyl phosphate; the solvent is selected from the group consisting of methanol, ethanol, acetone, and acetonitrile; the N-(arylvinyl)benzamide derivative is selected from the group consisting of N-(styryl)benzamide, 2-methyl-N-(styryl)benzamide, 2-methoxy-N-(styryl)-benzamide, 2-chloro-N-(styryl)benzamide, 2-fluoro-N-(styryl) benzamide, 2-bromo-N-(styryl)benzamide, 3-methyl-N-(styryl)benzamide, 3-methoxy-N-(styryl)benzamide, 3-chloro-N-(styryl)benzamide, 3-fluoro-N-(styryl)benzamide, 3 bromo-N-(styryl)benzamide, 4-methyl-N-(styryl) benzamide, 4-methoxy-N-(styryl)benzamide, 4-chloro-N-(styryl)benzamide, 4-fluoro-N-(styryl)benzamide, and 4-bromo-N-(styryl)benzamide.

In the present invention, the reaction is tracked to completion by a thin layer chromatography and the reaction is performed at room temperature.

In the present invention, a molar ratio of the N-(arylvinyl) benzamide derivative:dialkyl phosphite:manganeseacetate: potassium carbonate is 1:2:2.5:2.

In the present invention, the (2-benzamido-1-arylvinyl) dialkylphosphonate derivative is reduced with Raney-Ni/$H_2$. Preferably, a molar ratio of the Raney-Ni is 20% of (2-benzamido-1-arylvinyl)dialkylphosphonate derivative.

(2-Benzamido-1-arylethyl) dialkylphosphonate derivatives are hydrolyzed with hydrochloric acid, which is also as the solvent.

In the present invention, the chemical structural formula of the (2-benzamido-1-arylvinyl)dialkylphosphonate derivative is as follow:

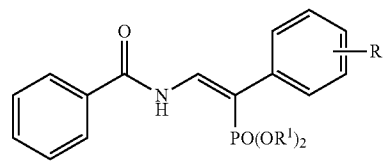

The chemical structural formula of β-amino phosphonic acid derivative is as follows:

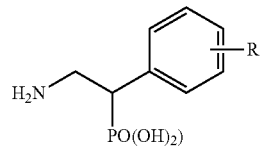

The chemical structural formula of (2-benzamido-1-arylethyl)dialkylphosphonate derivative is as follows:

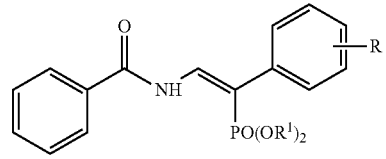

The reaction process of the above technical solution can be expressed as:

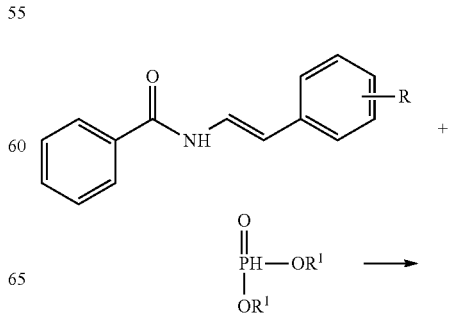

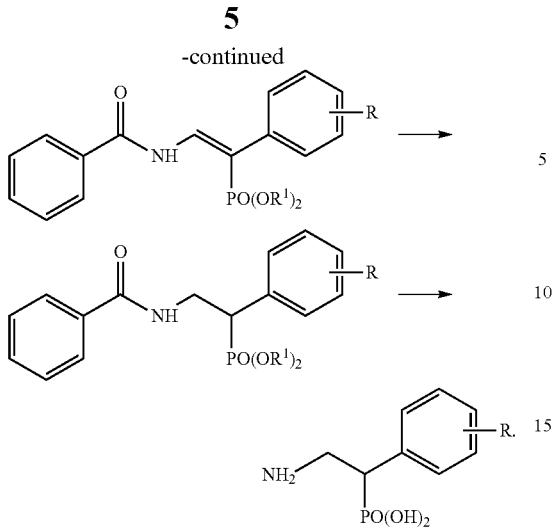

Beneficial Effects

Due to the application of the above technical solutions, the present invention has the following advantages over the prior art:

1. In the present invention, N-(arylvinyl)benzamide derivatives are used as starting materials, and the raw materials are readily available; by using the method of the present invention, a new type of β-aminophosphonic acid derivatives can be obtained.

2. The invention has mild reaction conditions, few steps, simple reaction operation and post-treatment process, high yield, and is suitable for large-scale production.

EMBODIMENTS OF THE INVENTION

The following further describes the present invention with reference to the embodiments:

Example 1: Synthesis of 2-amino-1-phenethylphosphonic Acid

Taking N-(styryl)benzamide as the raw material, the reaction steps are as follow:

(1) Mixing N-(styryl)benzamide (223 mg, 1 mmol), dimethyl phosphite (220 mg, 2 mmol), manganese acetate (580 mg, 2.5 mmol), anhydrous potassium carbonate (276 mg, 2 mmol) and methanol (10 mL) in a reaction bottle. The mixture was stirred at room temperature for reaction; TLC followed the whole reaction to completion (for about 0.5 hour).

(2) After the reaction, the crude product was separated by column chromatography (dichloromethane:methanol=100:1) to obtain the target product (yield 85%). The analytical data of the products are as follows: $^1$H NMR (400 MHz, CDCl$_3$): δ 8.19-8.06 (m, 2H), 7.64-7.60 (m, 2H), 7.52 (dd, J=15.0, 7.5 Hz, 3H), 7.45-7.37 (m, 5H), 3.78 (s, 3H), 3.75 (s, 3H).

(3) Adding (2-benzamido-1-styryl)dimethylphosphonate (281 mg, 0.85 mmol), Raney-Ni (56.4 mg, 20 mol %), methanol (10 mL) into a reaction kettle. At 40° C. with hydrogen (10 atm), the reaction took for 24 hours. The reaction product was filtered and concentrated to obtain the product (2-benzamido-1-phenethyl) dimethylphosphonate (283 mg, 0.85 mmol); then hydrochloric acid (8M, 10 mL) was added, the mixture was refluxed, and the whole reaction was followed by TLC. The reaction solution was cooled to room temperature, washed with dichloromethane, concentrated, and recrystallized to obtain 2-amino-1-phenethylphosphonic acid (83 mg, 0.69 mmol, yield 81%). The analytical data of the product is as follows: $^1$H NMR (400 MHz, D2O): δ 7.40-7.24 (m, 5H), 3.62-3.36 (m, 2H), 3.30-3.11 (m, 1H).

If manganese acetate was replaced with copper bromide or silver nitrate, or manganese acetate/potassium carbonate was replaced with copper bromide/silver nitrate, the product cannot be prepared.

Example 2: Synthesis of 2-amino-1-(2-tolyl)ethylphosphonic Acid

Taking N-(2-methylstyryl) benzamide as the raw material, the reaction steps are as follow:

(1) Mixing N-(2-methylstyryl)benzamide (237 mg, 1 mmol), dimethyl phosphite (220 mg, 2 mmol), manganese acetate (580 mg, 2.5 mmol), anhydrous potassium carbonate (276 mg, 2 mmol) and methanol (10 mL) in a reaction bottle. The mixture was stirred at room temperature for reaction; TLC followed the whole reaction to completion (for about 0.5 hour).

(2) After the reaction, the crude product was separated by column chromatography (dichloromethane:methanol=100:1) to obtain the (2-benzamido-1-(2-tolyl)vinyl) dimethylphosphonate (280 mg, 0.81 mmol, 81% yield). The analytical data of the products are as follows: $^1$H NMR (400 MHz, CDCl$_3$): δ 8.19-8.06 (m, 2H), 7.70-7.50 (m, 3H), 7.40-6.80 (m, 4H), 3.78 (s, 3H), 3.75 (s, 3H), 1.75 (s, 3H).

(3) Adding the above product (280 mg, 0.81 mmol), Raney-Ni (56.4 mg, 20 mol %), methanol (10 mL) into a reaction kettle. At 40° C. with hydrogen (10 atm), the reaction took for 24 hours. The reaction product was filtered and concentrated to obtain the (2-benzamido-1-(2-tolyl)ethyl)dimethylphosphonate (281 mg, 0.81 mmol); then hydrochloric acid (8M, 10 mL) was added, the mixture was refluxed, and the whole reaction was followed by TLC. The reaction solution was cooled to room temperature, washed with dichloromethane, concentrated, and recrystallized to obtain 2-amino-1-(2-tolyl)ethylphosphonic acid (87 mg, 0.65 mmol, yield 80%). The analytical data of the product is as follows: $^1$H NMR (400 MHz, D$_2$O): δ 7.40-7.24 (m, 4H), 3.62-3.36 (m, 2H), 3.30-3.11 (m, 1H), 1.75 (s, 3H).

Example 3: Synthesis of 2-amino-1-(2-methoxyphenyl)ethylphosphonic Acid

Taking N-(2-methoxystyryl)benzamide as the raw material, the reaction steps are as follow:

(1) Mixing N-(2-methoxystyryl)benzamide (253 mg, 1 mmol), dimethyl phosphite (220 mg, 2 mmol), manganese acetate (580 mg, 2.5 mmol), anhydrous potassium carbonate (276 mg, 2 mmol) and methanol (10 mL) in a reaction bottle. The mixture was stirred at room temperature for reaction; TLC followed the whole reaction to completion (for about 0.5 hour).

(2) After the reaction, the crude product was separated by column chromatography (dichloromethane:methanol=100:1) to obtain the (2-benzamido-1-(2-methoxyphenyl)vinyl) dimethyl phosphonate (289 mg, 0.80 mmol, 80% yield). The analytical data of the products are as follows: $^1$H NMR (400 MHz, CDCl$_3$): δ 8.21-8.01 (m, 2H), 7.70-7.50 (m, 4H), 7.40-6.80 (m, 5H), 3.79 (s, 3H), 3.77 (s, 3H), 3.74 (s, 3H).

(3) Adding the above product (289 mg, 0.80 mmol), Raney-Ni (56.4 mg, 20 mol %), methanol (10 mL) into a reaction kettle. At 40° C. with hydrogen (10 atm), the reaction took for 24 hours. The reaction product was filtered and concentrated to obtain the (2-benzamido-1-(2-methoxyphenyl)ethyl)dimethylphosphonate (291 mg, 0.80 mmol); then hydrochloric acid (8M, 10 mL) was added, the mixture was refluxed, and the whole reaction was followed by TLC. The reaction solution was cooled to room temperature, washed with dichloromethane, concentrated, and recrystallized to obtain 2-amino-1-(2-methoxyphenyl)ethylphosphonic acid (95 mg, 0.63 mmol, yield 79%). The analytical data of the product is as follows: $^1$H NMR (400 MHz, D$_2$O): δ 7.40-7.10 (m, 4H), 3.62-3.36 (m, 2H), 3.30-3.11 (m, 1H), 3.85 (s, 3H).

Example 4: Synthesis of 2-amino-1-(2-chlorophenyl)ethylphosphonic Acid

Taking N-(2-chlorostyryl) benzamide as the raw material, the reaction steps are as follow:

(1) Mixing N-(2-chlorostyryl)benzamide (257 mg, 1 mmol), dimethyl phosphite (220 mg, 2 mmol), manganese acetate (580 mg, 2.5 mmol), anhydrous potassium carbonate (276 mg, 2 mmol) and ethanol (10 mL) in a reaction bottle. The mixture was stirred at room temperature for reaction; TLC followed the whole reaction to completion (for about 0.5 hour).

(2) After the reaction, the crude product was separated by column chromatography (dichloromethane:methanol=100:1) to obtain the (2-benzamido-1-(2-chlorophenyl)vinyl) dimethylphosphonic acid esters (296 mg, 0.81 mmol, 81% yield). The analytical data of the products are as follows: $^1$H NMR (400 MHz, CDCl$_3$): δ 8.25-7.90 (m, 2H), 7.70-7.50 (m, 4H), 7.45-7.20 (m, 5H), 3.76 (s, 3H), 3.73 (s, 3H).

(3) Adding the above product (296 mg, 0.81 mmol), Raney-Ni (56.4 mg, 20 mol %), methanol (10 mL) into a reaction kettle. At 40° C. with hydrogen (10 atm), the reaction took for 24 hours. The reaction product was filtered and concentrated to obtain the (2-benzamido-1-(2-chlorophenyl)ethyl)dimethylphosphonate (298 mg, 0.81 mmol); then hydrochloric acid (8M, 10 mL) was added, the mixture was refluxed, and the whole reaction was followed by TLC. The reaction solution was cooled to room temperature, washed with dichloromethane, concentrated, and recrystallized to obtain 2-amino-1-(2-chlorophenyl)ethylphosphonic acid (97 mg, 0.63 mmol, yield 78%). The analytical data of the product is as follows: $^1$H NMR (400 MHz, D$_2$O): δ 7.40-7.24 (m, 4H), 3.62-3.36 (m, 2H), 3.30-3.11 (m, 1H).

Example 5: Synthesis of 2-amino-1-(2-fluorophenyl)ethylphosphonic Acid

Taking N-(2-fluorostyryl)benzamide) as the raw material, the reaction steps are as follow:

(1) Mixing N-(2-fluorostyryl)benzamide) (241 mg, 1 mmol), dimethyl phosphite (220 mg, 2 mmol), manganese acetate (580 mg, 2.5 mmol), anhydrous potassium carbonate (276 mg, 2 mmol) and methanol (10 mL) in a reaction bottle. The mixture was stirred at room temperature for reaction; TLC followed the whole reaction to completion (for about 0.5 hour).

(2) After the reaction, the crude product was separated by column chromatography (dichloromethane:methanol=100:1) to obtain the (2-benzamido-1-(2-fluorophenyl)vinyl) dimethylphosphonic acid esters (286 mg, 0.82 mmol, 82% yield). The analytical data of the products are as follows: $^1$H NMR (400 MHz, CDCl$_3$): δ 8.25-7.90 (m, 2H), 7.70-7.50 (m, 4H), 7.45-7.20 (m, 5H), 3.77 (s, 3H), 3.74 (s, 3H).

(3) Adding the above product (286 mg, 0.82 mmol), Raney-Ni (56.4 mg, 20 mol %), methanol (10 mL) into a reaction kettle. At 40° C. with hydrogen (10 atm), the reaction took for 24 hours. The reaction product was filtered and concentrated to obtain the (2-benzamido-1-(2-fluorophenyl)ethyl)dimethylphosphonate (288 mg, 0.82 mmol); then hydrochloric acid (8M, 10 mL) was added, the mixture was refluxed, and the whole reaction was followed by TLC. The reaction solution was cooled to room temperature, washed with dichloromethane, concentrated, and recrystallized to obtain 2-amino-1-(2-fluorophenyl)ethylphosphonic acid (92 mg, 0.66 mmol, yield 81%). The analytical data of the product is as follows: $^1$H NMR (400 MHz, D$_2$O): δ 7.40-7.26 (m, 4H), 3.62-3.36 (m, 2H), 3.30-3.11 (m, 1H).

Example 6: Synthesis of 2-amino-1-(2-bromophenyl)ethylphosphonic Acid

Taking N-(2-bromostyryl)benzamide as the raw material, the reaction steps are as follow:

(1) Mixing N-(2-bromostyryl)benzamide (301 mg, 1 mmol), dimethyl phosphite (220 mg, 2 mmol), manganese acetate (580 mg, 2.5 mmol), anhydrous potassium carbonate (276 mg, 2 mmol) and acetone (10 mL) in a reaction bottle. The mixture was stirred at room temperature for reaction; TLC followed the whole reaction to completion (for about 0.5 hour).

(2) After the reaction, the crude product was separated by column chromatography (dichloromethane:methanol=100:1) to obtain the (2-benzamido-1-(2-bromophenyl)vinyl) dimethylphosphonic acid ester (340 mg, 0.83 mmol, 83% yield). The analytical data of the products are as follows: $^1$H NMR (400 MHz, CDCl$_3$): δ8.25-7.90 (m, 2H), 7.70-7.50 (m, 6H), 7.45-7.20 (m, 3H), 3.79 (s, 3H), 3.75 (s, 3H).

(3) Adding the above product (340 mg, 0.83 mmol), Raney-Ni (56.4 mg, 20 mol %), methanol (10 mL) into a reaction kettle. At 40° C. with hydrogen (10 atm), the reaction took for 24 hours. The reaction product was filtered and concentrated to obtain the (2-benzamido-1-(2-bromophenyl)ethyl)dimethylphosphonate (341 mg, 0.83 mmol); then hydrochloric acid (8M, 10 mL) was added, the mixture was refluxed, and the whole reaction was followed by TLC. The reaction solution was cooled to room temperature, washed with dichloromethane, concentrated, and recrystallized to obtain 2-amino-1-(2-bromophenyl)ethylphosphonic acid (135 mg, 0.68 mmol, yield 82%). The analytical data of the product is as follows: $^1$H NMR (400 MHz, D$_2$O): δ7.40-7.24 (m, 4H), 3.62-3.36 (m, 2H), 3.30-3.11 (m, 1H).

Example 7: Synthesis of 2-amino-1-(3-tolyl)ethylphosphonic Acid

Taking N-(3-methylstyryl) benzamide as the raw material, the reaction steps are as follow:

(1) Mixing N-(3-methylstyryl)benzamide (237 mg, 1 mmol), dimethyl phosphite (220 mg, 2 mmol), manganese acetate (580 mg, 2.5 mmol), anhydrous potassium carbonate (276 mg, 2 mmol) and methanol (10 mL) in the reaction bottle. The mixture was stirred at room temperature for reaction; TLC followed the whole reaction to completion (for about 0.5 hour).

(2) After the reaction, the crude product was separated by column chromatography (dichloromethane:methanol=100:1) to obtain the (2-benzamido-1-(3-tolyl)vinyl) dimethylphosphonate (293 mg, 0.85 mmol, yield 85%). The analytical data of the products are as follows: $^1$H NMR (400

MHz, CDCl$_3$): δ8.19-8.06 (m, 2H), 7.70-7.50 (m, 4H), 7.40-6.80 (m, 5H), 3.78 (s, 3H), 3.75 (s, 3H), 1.75 (s, 3H).

(3) Adding the above product (293 mg, 0.85 mmol), Raney-Ni (56.4 mg, 20 mol %), methanol (10 mL) into a reaction kettle. At 40° C. with hydrogen (10 atm), the reaction took for 24 hours. The reaction product was filtered and concentrated to obtain the (2-benzamido-1-(3-tolyl)ethyl)dimethylphosphonate (295 mg, 0.85 mmol); then hydrochloric acid (8M, 10 mL) was added, the mixture was refluxed, and the whole reaction was followed by TLC. The reaction solution was cooled to room temperature, washed with dichloromethane, concentrated, and recrystallized to obtain 2-amino-1-(3-tolyl)ethylphosphonic acid (97 mg, 0.72 mmol, yield 85%). The analytical data of the product is as follows: $^1$H NMR (400 MHz, D$_2$O): δ7.40-7.24 (m, 4H), 3.62-3.36 (m, 2H), 3.30-3.11 (m, 1H), 1.75 (s, 3H).

Example 8: Synthesis of 2-amino-1-(3-methoxyphenyl)ethylphosphonic Acid

Taking N-(3-methoxystyryl)benzamide as the raw material, the reaction steps are as follow:

(1) Mixing N-(3-methoxystyryl)benzamide (253 mg, 1 mmol), dimethyl phosphite (220 mg, 2 mmol), manganese acetate (580 mg, 2.5 mmol), anhydrous potassium carbonate (276 mg, 2 mmol) and methanol (10 mL) in a reaction bottle. The mixture was stirred at room temperature for reaction; TLC followed the whole reaction to completion (for about 0.5 hour).

(2) After the reaction, the crude product was separated by column chromatography (dichloromethane:methanol=100:1) to obtain the (2-benzamido-1-(3-methoxyphenyl)vinyl)dimethyl phosphonate (314 mg, 0.87 mmol, 87% yield). The analytical data of the products are as follows: $^1$H NMR (400 MHz, CDCl$_3$): δ8.21-8.01 (m, 2H), 7.70-7.50 (m, 4H), 7.40-6.80 (m, 5H), 3.79 (s, 3H), 3.77 (s, 3H), 3.74 (s, 3H).

(3) Adding the above product (314 mg, 0.87 mmol), Raney-Ni (56.4 mg, 20 mol %), methanol (10 mL) into a reaction kettle. At 40° C. with hydrogen (10 atm), the reaction took for 24 hours. The reaction product was filtered and concentrated to obtain the (2-benzamido-1-(3-methoxyphenyl)ethyl)dimethylphosphonate (316 mg, 0.87 mmol); then hydrochloric acid (8M, 10 mL) was added, the mixture was refluxed, and the whole reaction was followed by TLC. The reaction solution was cooled to room temperature, washed with dichloromethane, concentrated, and recrystallized to obtain 2-amino-1-(3-methoxyphenyl)ethylphosphonic acid (112 mg, 0.75 mmol, yield 86%). The analytical data of the product is as follows: $^1$H NMR (400 MHz, D$_2$O): δ7.40-7.24 (m, 4H), 3.62-3.36 (m, 2H), 3.30-3.11 (m, 1H), 3.80 (s, 3H).

Example 9: Synthesis of 2-amino-1-(3-chlorophenyl)ethylphosphonic Acid

Taking N-(3-chlorostyryl)benzamide as the raw material, the reaction steps are as follow:

(1) Mixing N-(3-chlorostyryl)benzamide (257 mg, 1 mmol), dimethyl phosphite (220 mg, 2 mmol), manganese acetate (580 mg, 2.5 mmol), anhydrous potassium carbonate (276 mg, 2 mmol) and acetonitrile (10 mL) in a reaction bottle. The mixture was stirred at room temperature for reaction; TLC followed the whole reaction to completion (for about 0.5 hour).

(2) After the reaction, the crude product was separated by column chromatography (dichloromethane:methanol=100:1) to obtain the (2-benzamido-1-(3-chlorophenyl)vinyl)dimethylphosphonic acid esters (314 mg, 0.86 mmol, 86% yield). The analytical data of the products are as follows: $^1$H NMR (400 MHz, CDCl$_3$): δ8.25-7.90 (m, 2H), 7.70-7.50 (m, 4H), 7.45-7.20 (m, 5H), 3.76 (s, 3H), 3.73 (s, 3H).

(3) Adding the above product (314 mg, 0.86 mmol), Raney-Ni (56.4 mg, 20 mol %), methanol (10 mL) into a reaction kettle. At 40° C. with hydrogen (10 atm), the reaction took for 24 hours. The reaction product was filtered and concentrated to obtain the (2-benzamido-1-(3-chlorophenyl)ethyl)dimethylphosphonate (316 mg, 0.86 mmol); then hydrochloric acid (8M, 10 mL) was added, the mixture was refluxed, and the whole reaction was followed by TLC. The reaction solution was cooled to room temperature, washed with dichloromethane, concentrated, and recrystallized to obtain 2-amino-1-(3-chlorophenyl)ethylphosphonic acid (111 mg, 0.72 mmol, yield 84%). The analytical data of the product is as follows: $^1$H NMR (400 MHz, D$_2$O): δ7.40-7.24 (m, 4H), 3.62-3.36 (m, 2H), 3.30-3.11 (m, 1H).

Example 10: Synthesis of 2-amino-1-(3-fluorophenyl) ethylphosphonic Acid

Taking N-(3-fluorostyryl)benzamide as the raw material, the reaction steps are as follow:

(1) Mixing N-(3-fluorostyryl)benzamide (241 mg, 1 mmol), dimethyl phosphite (220 mg, 2 mmol), manganese acetate (580 mg, 2.5 mmol), anhydrous potassium carbonate (276 mg, 2 mmol) and methanol (10 mL) in the reaction bottle. The mixture was stirred at room temperature for reaction; TLC followed the whole reaction to completion (for about 0.5 hour).

(2) After the reaction, the crude product was separated by column chromatography (dichloromethane:methanol=100:1) to obtain the (2-benzamido-1-(3-fluorophenyl)vinyl) dimethylphosphonic acid esters (293 mg, 0.84 mmol, 84% yield). The analytical data of the products are as follows: $^1$H NMR (400 MHz, CDCl$_3$): δ8.25-7.90 (m, 2H), 7.70-7.50 (m, 4H), 7.45-7.20 (m, 5H), 3.77 (s, 3H), 3.74 (s, 3H).

(3) Adding the above product (293 mg, 0.84 mmol), Raney-Ni (56.4 mg, 20 mol %), methanol (10 mL) into a reaction kettle. At 40° C. with hydrogen (10 atm), the reaction took for 24 hours. The reaction product was filtered and concentrated to obtain the (2-benzamido-1-(3-fluorophenyl) ethyl) dimethylphosphonate (295 mg, 0.84 mmol); then hydrochloric acid (8M, 10 mL) was added, the mixture was refluxed, and the whole reaction was followed by TLC. The reaction solution was cooled to room temperature, washed with dichloromethane, concentrated, and recrystallized to obtain 2-amino-1-(3-fluorophenyl) ethylphosphonic acid (95 mg, 0.69 mmol, yield 82%). The analytical data of the product is as follows: $^1$H NMR (400 MHz, D$_2$O): δ7.40-7.24 (m, 4H), 3.62-3.36 (m, 2H), 3.30-3.11 (m, 1H).

Example 11: Synthesis of 2-amino-1-(3-bromophenyl) ethylphosphonic Acid

Taking N-(3-bromostyryl)benzamide as the raw material, the reaction steps are as follow:

(1) Mixing N-(3-bromostyryl)benzamide (301 mg, 1 mmol), dimethyl phosphite (220 mg, 2 mmol), manganese acetate (580 mg, 2.5 mmol), anhydrous potassium carbonate (276 mg, 2 mmol) and methanol (10 mL) in the reaction bottle. The mixture was stirred at room temperature for reaction; TLC followed the whole reaction to completion (for about 0.5 hour).

(2) After the reaction, the crude product was separated by column chromatography (dichloromethane:methanol=100:1) to obtain the (2-benzamido-1-(3-bromophenyl)vinyl) dimethylphosphonic acid ester (360 mg, 0.88 mmol, 88% yield). The analytical data of the products are as follows: $^1$H NMR (400 MHz, CDCl$_3$): δ8.25-7.90 (m, 2H), 7.70-7.50 (m, 6H), 7.45-7.20 (m, 3H), 3.79 (s, 3H), 3.75 (s, 3H).

(3) Adding the above product (360 mg, 0.88 mmol), Raney-Ni (56.4 mg, 20 mol %), methanol (10 mL) into a reaction kettle. At 40° C. with hydrogen (10 atm), the reaction took for 24 hours. The reaction product was filtered and concentrated to obtain the (2-benzamido-1-(3-bromophenyl)ethyl)dimethylphosphonate (362 mg, 0.88 mmol); then hydrochloric acid (8M, 10 mL) was added, the mixture was refluxed, and the whole reaction was followed by TLC. The reaction solution was cooled to room temperature, washed with dichloromethane, concentrated, and recrystallized to obtain 2-amino-1-(3-bromophenyl)ethylphosphonic acid (148 mg, 0.75 mmol, yield 85%). The analytical data of the product is as follows: $^1$H NMR (400 MHz, D$_2$O): δ7.40-7.24 (m, 4H), 3.62-3.36 (m, 2H), 3.30-3.11 (m, 1H).

Example 12: Synthesis of 2-amino-1-(4-tolyl)ethylphosphonic Acid

Taking N-(4-methylstyryl)benzamide as the raw material, the reaction steps are as follow:

(1) Mixing N-(4-methylstyryl) benzamide (237 mg, 1 mmol), dimethyl phosphite (220 mg, 2 mmol), manganese acetate (580 mg, 2.5 mmol), anhydrous potassium carbonate (276 mg, 2 mmol) and acetonitrile (10 mL) in the reaction bottle. The mixture was stirred at room temperature for reaction; TLC followed the whole reaction to completion (for about 0.5 hour).

(2) After the reaction, the crude product was separated by column chromatography (dichloromethane:methanol=100:1) to obtain the (2-benzamido-1-(4-tolyl)vinyl) dimethylphosphonate (307 mg, 0.89 mmol, 89% yield). The analytical data of the products are as follows: $^1$H NMR (400 MHz, CDCl$_3$): δ8.19-8.06 (m, 2H), 7.70-7.50 (m, 4H), 7.40-6.80 (m, 5H), 3.78 (s, 3H), 3.75 (s, 3H), 1.75 (s, 3H).

(3) Adding the above product (307 mg, 0.89 mmol), Raney-Ni (56.4 mg, 20 mol %), methanol (10 mL) into a reaction kettle. At 40° C. with hydrogen (10 atm), the reaction took for 24 hours. The reaction product was filtered and concentrated to obtain the (2-benzamido-1-(4-tolyl)ethyl)dimethylphosphonate (309 mg, 0.89 mmol); then hydrochloric acid (8M, 10 mL) was added, the mixture was refluxed, and the whole reaction was followed by TLC. The reaction solution was cooled to room temperature, washed with dichloromethane, concentrated, and recrystallized to obtain 2-amino-1-(4-tolyl)ethylphosphonic acid (107 mg, 0.80 mmol, yield 90%). The analytical data of the product is as follows: $^1$H NMR (400 MHz, D$_2$O): δ7.40-7.20 (m, 4H), 3.62-3.36 (m, 2H), 3.30-3.11 (m, 1H), 1.77 (s, 3H).

Example 13: Synthesis of 2-amino-1-(4-methoxyphenyl)ethylphosphonic Acid

Taking N-(4-methoxystyryl) benzamide) as the raw material, the reaction steps are as follow:

(1) Mixing N-(4-methoxystyryl) benzamide (253 mg, 1 mmol), dimethyl phosphite (220 mg, 2 mmol), manganese acetate (580 mg, 2.5 mmol), anhydrous potassium carbonate (276 mg, 2 mmol) and methanol (10 mL) in the reaction bottle. The mixture was stirred at room temperature for reaction; TLC followed the whole reaction to completion (for about 0.5 hour).

(2) After the reaction, the crude product was separated by column chromatography (dichloromethane:methanol=100:1) to obtain the (2-benzamido-1-(4-methoxyphenyl) vinyl) dimethyl Phosphonate (325 mg, 0.90 mmol, 90% yield). The analytical data of the products are as follows: $^1$H NMR (400 MHz, CDCl$_3$): δ8.21-8.01 (m, 2H), 7.70-7.50 (m, 4H), 7.40-6.80 (m, 5H), 3.79 (s, 3H), 3.77 (s, 3H), 3.74 (s, 3H).

(3) Adding the above product (325 mg, 0.90 mmol), Raney-Ni (56.4 mg, 20 mol %), methanol (10 mL) into a reaction kettle. At 40° C. with hydrogen (10 atm), the reaction took for 24 hours. The reaction product was filtered and concentrated to obtain the (2-benzamido-1-(4-methoxyphenyl) ethyl) dimethylphosphonate (327 mg, 0.90 mmol); then hydrochloric acid (8M, 10 mL) was added, the mixture was refluxed, and the whole reaction was followed by TLC. The reaction solution was cooled to room temperature, washed with dichloromethane, concentrated, and recrystallized to obtain 2-amino-1-(4-methoxyphenyl) ethylphosphonic acid (119 mg, 0.79 mmol, yield 88%). The analytical data of the product is as follows: $^1$H NMR (400 MHz, D$_2$O): δ7.40-7.05 (m, 4H), 3.62-3.36 (m, 2H), 3.30-3.11 (m, 1H), 3.78 (s, 3H).

Example 14: Synthesis of 2-amino-1-(4-chlorophenyl)ethylphosphonic Acid

Taking N-(4-chlorostyryl)benzamide as the raw material, the reaction steps are as follow:

(1) Mixing N-(4-chlorostyryl)benzamide (257 mg, 1 mmol), dimethyl phosphite (220 mg, 2 mmol), manganese acetate (580 mg, 2.5 mmol), anhydrous potassium carbonate (276 mg, 2 mmol) and ethanol (10 mL) in the reaction bottle. The mixture was stirred at room temperature for reaction; TLC followed the whole reaction to completion (for about 0.5 hour).

(2) After the reaction, the crude product was separated by column chromatography (dichloromethane:methanol=100:1) to obtain the (2-benzamido-1-(4-chlorophenyl)vinyl) dimethylphosphonic acid ester (329 mg, 0.90 mmol, 90% yield). The analytical data of the products are as follows: $^1$H NMR (400 MHz, CDCl$_3$): δ8.25-7.90 (m, 2H), 7.70-7.50 (m, 4H), 7.45-7.20 (m, 5H), 3.76 (s, 3H), 3.73 (s, 3H).

(3) Adding the above product (329 mg, 0.90 mmol), Raney-Ni (56.4 mg, 20 mol %), methanol (10 mL) into a reaction kettle. At 40° C. with hydrogen (10 atm), the reaction took for 24 hours. The reaction product was filtered and concentrated to obtain the (2-benzamido-1-(4-chlorophenyl)ethyl)dimethylphosphonate (330 mg, 0.90 mmol); then hydrochloric acid (8M, 10 mL) was added, the mixture was refluxed, and the whole reaction was followed by TLC. The reaction solution was cooled to room temperature, washed with dichloromethane, concentrated, and recrystallized to obtain 2-amino-1-(4-chlorophenyl)ethylphosphonic acid (122 mg, 0.79 mmol, yield 88%). The analytical data of the product is as follows: $^1$H NMR (400 MHz, D$_2$O): δ7.40-7.24 (m, 4H), 3.62-3.36 (m, 2H), 3.30-3.11 (m, 1H).

Example 15: Synthesis of 2-amino-1-(4-fluorophenyl)ethylphosphonic Acid

Taking N-(4-fluorostyryl)benzamide as the raw material, the reaction steps are as follow:

(1) Mixing N-(4-fluorostyryl)benzamide (241 mg, 1 mmol), dimethyl phosphite (220 mg, 2 mmol), manganese acetate (580 mg, 2.5 mmol), anhydrous potassium carbonate (276 mg, 2 mmol) and methanol (10 mL) in a reaction bottle. The mixture was stirred at room temperature for reaction; TLC followed the whole reaction to completion (for about 0.5 hour).

(2) After the reaction, the crude product was separated by column chromatography (dichloromethane:methanol=100:1) to obtain the (2-benzamido-1-(4-fluorophenyl)vinyl) dimethylphosphonic acid ester (307 mg, 0.88 mmol, 88% yield). The analytical data of the products are as follows: $^1$H NMR (400 MHz, CDCl$_3$): δ8.25-7.90 (m, 2H), 7.70-7.50 (m, 4H), 7.45-7.20 (m, 5H), 3.77 (s, 3H), 3.74 (s, 3H).

(3) Adding the above product (307 mg, 0.88 mmol), Raney-Ni (56.4 mg, 20 mol %), methanol (10 mL) into a reaction kettle. At 40° C. with hydrogen (10 atm), the reaction took for 24 hours. The reaction product was filtered and concentrated to obtain the (2-benzamido-1-(4-fluorophenyl)ethyl)dimethylphosphonate (309 mg, 0.88 mmol); then hydrochloric acid (8M, 10 mL) was added, the mixture was refluxed, and the whole reaction was followed by TLC. The reaction solution was cooled to room temperature, washed with dichloromethane, concentrated, and recrystallized to obtain 2-amino-1-(4-fluorophenyl)ethylphosphonic acid (103 mg, 0.75 mmol, yield 85%). The analytical data of the product is as follows: $^1$H NMR (400 MHz, D$_2$O): δ7.40-7.22 (m, 4H), 3.62-3.36 (m, 2H), 3.30-3.11 (m, 1H).

Example 16: Synthesis of 2-amino-1-(4-bromophenyl)ethylphosphonic Acid

Taking N-(4-bromostyryl) benzamide as the raw material, the reaction steps are as follow:

(1) Mixing N-(4-bromostyryl)benzamide (301 mg, 1 mmol), dimethyl phosphite (220 mg, 2 mmol), manganese acetate (580 mg, 2.5 mmol), anhydrous potassium carbonate (276 mg, 2 mmol) and methanol (10 mL) in the reaction bottle. The mixture was stirred at room temperature for reaction; TLC followed the whole reaction to completion (for about 0.5 hour).

(2) After the reaction, the crude product was separated by column chromatography (dichloromethane:methanol=100:1) to obtain the (2-benzamido-1-(4-bromophenyl)vinyl) dimethylphosphonic acid ester (352 mg, 0.86 mmol, 86% yield). The analytical data of the products are as follows: $^1$H NMR (400 MHz, CDCl$_3$): δ8.25-7.90 (m, 2H), 7.70-7.50 (m, 6H), 7.45-7.20 (m, 3H), 3.79 (s, 3H), 3.75 (s, 3H).

(3) Adding the above product (352 mg, 0.86 mmol), Raney-Ni (56.4 mg, 20 mol %), methanol (10 mL) into a reaction kettle. At 40° C. with hydrogen (10 atm), the reaction took for 24 hours. The reaction product was filtered and concentrated to obtain the (2-benzamido-1-(4-bromophenyl)ethyl)dimethylphosphonate (354 mg, 0.86 mmol); then hydrochloric acid (8M, 10 mL) was added, the mixture was refluxed, and the whole reaction was followed by TLC. The reaction solution was cooled to room temperature, washed with dichloromethane, concentrated, and recrystallized to obtain 2-amino-1-(4-bromophenyl)ethylphosphonic acid (148 mg, 0.75 mmol, yield 87%). The analytical data of the product is as follows: $^1$H NMR (400 MHz, D$_2$O): δ7.41-7.24 (m, 4H), 3.62-3.36 (m, 2H), 3.30-3.11 (m, 1H).

Example 17: Synthesis of 2-amino-1-phenethylphosphonic Acid

Taking N-(styryl) benzamide as the raw material, the reaction steps are as follow:

(1) Mixing N-(styryl) benzamide (223 mg, 1 mmol), dimethyl phosphite (220 mg, 2 mmol), manganese acetate (580 mg, 2.5 mmol), anhydrous potassium carbonate (276 mg, 2 mmol) and methanol (10 mL) in the reaction bottle. The mixture was stirred at room temperature for reaction; TLC followed the whole reaction to completion (for about 0.5 hour).

(2) After the reaction, the crude product was separated by column chromatography (dichloromethane:methanol=100:1) to obtain the (2-benzamido-1-styryl)diethylphosphonate (316 mg, 0.88 mmol, 88% yield). The analytical data of the products are as follows: $^1$H NMR (400 MHz, CDCl$_3$): δ8.21-8.07 (m, 2H), 7.67-7.61 (m, 2H), 7.54 (dd, J=15.0, 7.5 Hz, 3H), 7.48-7.38 (m, 5H), 4.60-4.40 (m, 4H), 1.35-1.15 (m, 6H).

(3) Adding the above product (316 mg, 0.88 mmol), Raney-Ni (56.4 mg, 20 mol %), methanol (10 mL) into a reaction kettle. At 40° C. with hydrogen (10 atm), the reaction took for 24 hours. The reaction product was filtered and concentrated to obtain the (2-benzamido-1-phenethyl) diethylphosphonate (318 mg, 0.88 mmol); then hydrochloric acid (8M, 10 mL) was added, the mixture was refluxed, and the whole reaction was followed by TLC. The reaction solution was cooled to room temperature, washed with dichloromethane, concentrated, and recrystallized to obtain 2-amino-1-phenethylphosphonic acid (95 mg, 0.79 mmol, yield 90%). The analytical data of the product is as follows: $^1$H NMR (400 MHz, D$_2$O): δ7.38-7.26 (m, 5H), 3.62-3.36 (m, 2H), 3.30-3.11 (m, 1H).

Example 18: Synthesis of 2-amino-1-phenethylphosphonic Acid

Taking N-(styryl)benzamide as the raw material, the reaction steps are as follow:

(1) Mixing N-(styryl)benzamide (223 mg, 1 mmol), dimethyl phosphite (220 mg, 2 mmol), manganese acetate (580 mg, 2.5 mmol), anhydrous potassium carbonate (276 mg, 2 mmol) and methanol (10 mL) in the reaction bottle. The mixture was stirred at room temperature for reaction; TLC followed the whole reaction to completion (for about 0.5 hour).

(2) After the reaction, the crude product was separated by column chromatography (dichloromethane:methanol=100:1) to obtain the (2-benzamido-1-styryl)diisopropylphosphonate (329 mg, 0.85 mmol, yield 85%). The analytical data of the products are as follows: $^1$H NMR (400 MHz, CDCl$_3$): δ8.19-8.06 (m, 2H), 7.64-7.60 (m, 2H), 7.52 (dd, J=15.0, 7.5 Hz, 3H), 7.45-7.37 (m, 5H), 4.72-4.63 (m, 2H), 1.29 (d, J=6.2 Hz, 6H), 1.23 (d, J=6.2 Hz, 6H).

(3) Adding the above product (286 mg, 0.82 mmol), Raney-Ni (56.4 mg, 20 mol %), methanol (10 mL) into a reaction kettle. At 40° C. with hydrogen (10 atm), the reaction took for 24 hours. The reaction product was filtered and concentrated to obtain the (2-benzamido-1-phenethyl) diisopropylphosphonate (331 mg, 0.85 mmol, yield 85%); then hydrochloric acid (8M, 10 mL) was added, the mixture was refluxed, and the whole reaction was followed by TLC. The reaction solution was cooled to room temperature, washed with dichloromethane, concentrated, and recrystallized to obtain 2-amino-1-phenethylphosphonic acid (92 mg, 0.77 mmol, yield 90%). The analytical data of the product is as follows: $^1$H NMR (400 MHz, D$_2$O): 67.38-7.26 (m, 5H), 3.62-3.36 (m, 2H), 3.30-3.11 (m, 1H).

The invention claimed is:

1. A method for preparing a β-amino phosphonic acid derivative, which comprises the following steps:
dissolving an N-(arylvinyl)benzamide derivative, a dialkyl phosphite, manganese acetate, and potassium carbonate in a solvent and reacting at room temperature to obtain a (2-benzamido-1-arylvinyl)dialkylphosphonate derivative;
reducing the (2-benzamido-1-arylvinyl)dialkylphosphonate derivative to obtain a (2-benzamido-1-arylethyl)dialkylphosphonate derivative;
hydrolyzing the (2-benzamido-1-arylethyl)dialkylphosphonate derivative to obtain the (β-amino phosphonic acid derivative,
wherein the N-(arylvinyl) benzamide derivative has the following structure:

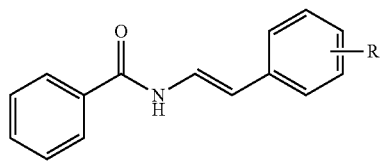

R is hydrogen, methyl, methoxy, fluorine, chlorine, or bromine;
the dialkyl phosphite has the following structure:

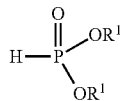

R$^1$ is methyl, ethyl, propyl, isopropyl, butyl, or tert-butyl.

2. A method for preparing a (2-benzamido-1-arylethyl) dialkylphosphonate derivative, which comprises the following steps:
dissolving an N-(arylvinyl)benzamide derivative, a dialkyl phosphite, manganese acetate, and potassium carbonate in a solvent and reacting at room temperature to obtain a (2-benzamido-1-arylvinyl)dialkylphosphonate derivative;
reducing the (2-benzamido-1-arylvinyl)dialkylphosphonate derivative to obtain the (2-benzamido-1-arylethyl) dialkylphosphonate derivative;
wherein the N-(arylvinyl)benzamide derivative has the following structure:

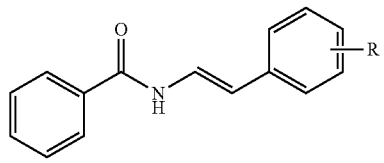

R is hydrogen, methyl, methoxy, fluorine, chlorine, or bromine;
the dialkyl phosphite has the following structure:

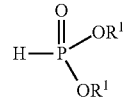

R$^1$ is methyl, ethyl, propyl, isopropyl, butyl, or tert-butyl.

3. The method according to claim 1, wherein the dialkyl phosphite is selected from the group consisting of dimethyl phosphite, diethyl phosphite, and diisopropyl phosphate; the solvent is selected from the group consisting of methanol, ethanol, acetone, and acetonitrile; the N-(arylvinyl)benzamide derivative is selected from the group consisting of N-(styryl)benzamide, 2 methyl-N-(styryl)benzamide, 2-methoxy-N-(styryl)-benzamide, 2-chloro-N-(styryl)benzamide, 2-fluoro-N-(styryl)benzamide, 2-bromo-N-(styryl) benzamide, 3-methyl-N-(styryl)benzamide, 3-methoxy-N-(styryl)benzamide, 3-chloro-N-(styryl)benzamide, 3-fluoro-N-(styryl)benzamide, 3 bromo-N-(styryl)benzamide, 4-methyl-N-(styryl)benzamide, 4-methoxy-N-(styryl)benzamide, 4-chloro-N-(styryl)benzamide, 4-fluoro-N-(styryl) benzamide, and 4-bromo-N-(styryl)benzamide.

4. The method according to claim 1, wherein the reaction is tracked to completion by a thin layer chromatography and the reaction is performed at room temperature.

5. The method according to claim 1, wherein a molar ratio of the N-(arylvinyl)benzamide derivative:the dialkyl phosphite:manganese acetate:potassium carbonate is 1:2:2.5:2.

6. The method according to claim 1, wherein the (2-benzamido-1-arylvinyl)-dialkylphosphonate derivative is reduced with Raney-Ni/H$_2$.

7. The method according to claim 1, wherein the (2-benzamido-1-arylethyl)dialkyl-phosphonate derivative is hydrolyzed with hydrochloric acid.

8. The method according to claim 2, wherein the dialkyl phosphite is selected from the group consisting of dimethyl phosphite, diethyl phosphite, and diisopropyl phosphate; the solvent is selected from the group consisting of methanol, ethanol, acetone, and acetonitrile; the N-(arylvinyl)benzamide derivative is selected from the group consisting of N-(styryl)benzamide, 2 methyl-N-(styryl)benzamide, 2-methoxy-N-(styryl)-benzamide, 2-chloro-N-(styryl)benzamide, 2-fluoro-N-(styryl)benzamide, 2-bromo-N-(styryl) benzamide, 3-methyl-N-(styryl)benzamide, 3-methoxy-N-(styryl)benzamide, 3-chloro-N-(styryl)benzamide, 3-fluoro-N-(styryl)benzamide, 3 bromo-N-(styryl)benzamide, 4-methyl-N-(styryl)benzamide, 4-methoxy-N-(styryl)benzamide, 4-chloro-N-(styryl)benzamide, 4-fluoro-N-(styryl) benzamide, and 4-bromo-N-(styryl)benzamide.

9. The method according to claim 2, wherein the reaction is tracked to completion by a thin layer chromatography and the reaction is performed at room temperature.

10. The method according to claim 2, wherein a molar ratio of the N-(arylvinyl)benzamide derivative:the dialkyl phosphite:manganese acetate:potassium carbonate is 1:2:2.5:2.

11. The method according to claim 2, wherein the (2-benzamido-1-arylvinyl)-dialkylphosphonate derivative is reduced with Raney-Ni/H$_2$.

* * * * *